United States Patent [19]
Woodbridge et al.

[11] Patent Number: 6,139,608
[45] Date of Patent: Oct. 31, 2000

[54] PROCESS FOR PRODUCING MELTBLOWN POLYOLEFIN FIBERS FOR MECHANICAL FILTRATION

[75] Inventors: Timothy John Woodbridge, Rickmansworth; Rowland Allen Griffin, Newcastle Upon Tyne, both of United Kingdom

[73] Assignee: Hunt Technology Limited, London, United Kingdom

[21] Appl. No.: 09/180,410

[22] PCT Filed: May 9, 1997

[86] PCT No.: PCT/GB97/01261

§ 371 Date: Nov. 6, 1999

§ 102(e) Date: Nov. 6, 1999

[87] PCT Pub. No.: WO97/43470

PCT Pub. Date: Nov. 20, 1997

[30] Foreign Application Priority Data

May 10, 1996 [GB] United Kingdom ............... 96098116

[51] Int. Cl.[7] ............... D01D 5/26; D01F 1/10; D01F 6/04

[52] U.S. Cl. ............... 96/15; 210/500.36; 264/12; 264/518; 524/104

[58] Field of Search ............... 264/12, 518; 96/15; 210/500.36; 524/104

[56] References Cited

FOREIGN PATENT DOCUMENTS 260011  3/1988  European Pat. Off. .
616831  9/1994  European Pat. Off. .

*Primary Examiner*—Leo B. Tentoni
*Attorney, Agent, or Firm*—Killworth, Gottman, Hagan & Schaeff, LLP

[57] ABSTRACT

A process for producing meltblown polyolefin fibres having an effective diameter of less than 5 microns, comprising providing a polyolefin having a melt flow index of at least 1000, mixing a fluorochemical with the polyolefin in order to increase the melt flow index of the polyolefin to at least 2000, and meltblowing the polyolefin with the fluorochemical in order to produce the meltblown polyolefin fibres, and the polyolefin being such that during the meltblowing the fluorochemical is able to migrate to the surface of the formed polyolefin fibres without the need for a separate annealing step.

12 Claims, 1 Drawing Sheet

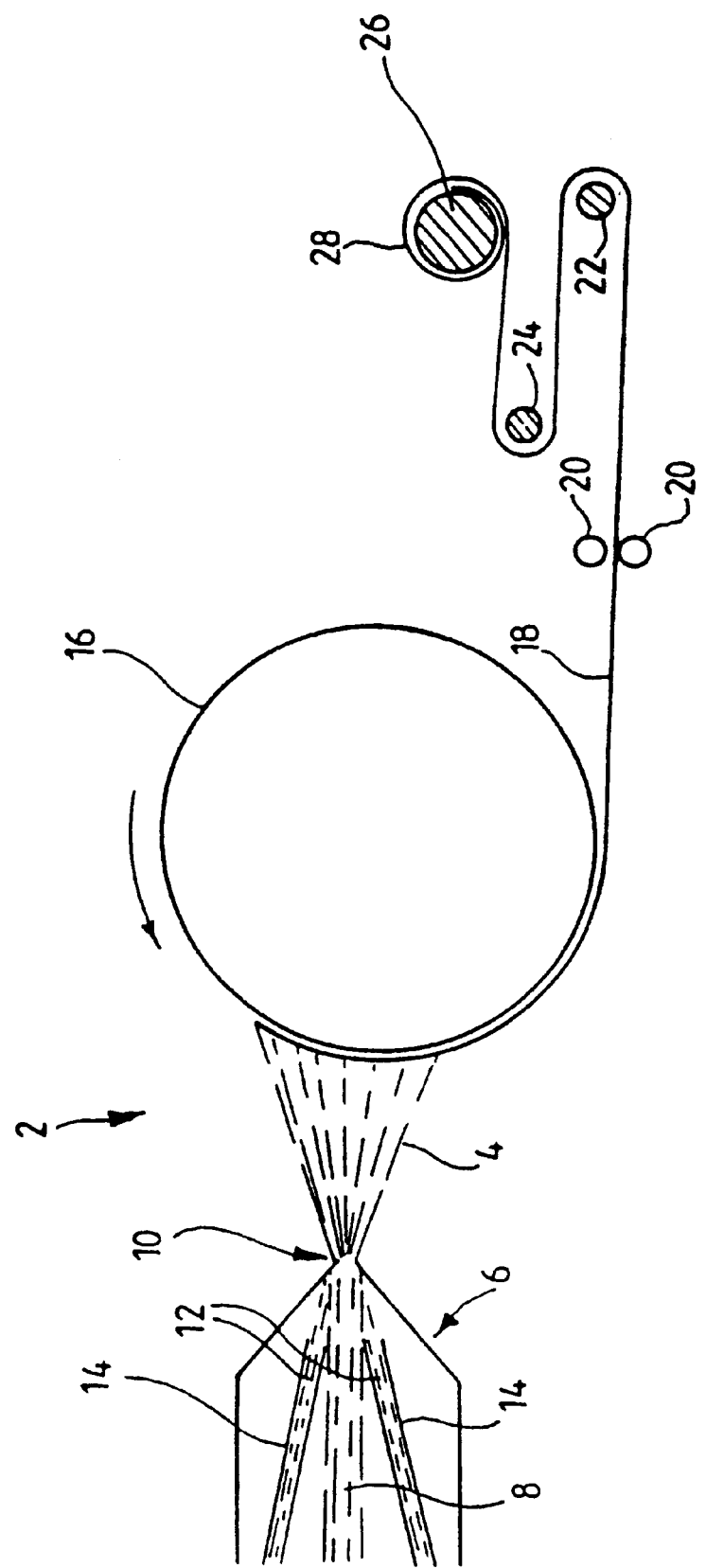

PROCESS FOR PRODUCING MELTBLOWN POLYOLEFIN FIBERS FOR MECHANICAL FILTRATION

BACKGROUND OF THE INVENTION

This invention relates to a process for producing meltblown polyolefin fibres for mechanical filtration This invention also relates to the meltblown polyolefin fibres when produced by the process of the invention, and to filters containing the meltblown polyolefin fibres.

Filters are widely used for industrial and medical purposes. Thus, for example, the filters may be air filters. The air filters may be in the form of industrial respirators, automative air filters, machine air filters, air conditioning filters, and clean room filters. The filters may alternatively be oilophobic mechanical filters such for example as hydraulic filters. The filters may alternatively be liquid barrier membrane filters using fibres which are calendered to control pore size. The filters may still further be medical air filters or face masks for surgeons.

The performance standards for air filters in Europe are known as Eurovent standards, and the performance standards in the USA are known as Ashrae standards. The standards challenge a filter over a defined period of time with increasing levels of dust, and they measure filtration efficiency, pressure drop and dust loading. The performance achieved by a filter is graded according to a pre-determined set of criteria with the grading ranging from 1 at the lowest level (giving a particle filtering efficiency of not more than 65%) to 14 at the highest level (giving a particle filtering efficiency of not less than 99.9995%).

Filters that operate with a Burovent/Ashrae standard of 6 and above have commonly used fibres made from glass. The glass fibres have an effective diameter of less than 5 microns in size and they rely-on mechanical characteristics for their filtration efficiency. It is also known to use polyolefin fibres having an effective diameter of more than 5 microns in size. Such polyolefin fibres provide only limited mechanical filtration efficiency in their mechanical state, and for Eurovent/Ashrae standards of 6 and above they have to be electrostatically charged in order to maintain their filtration efficiency.

There are two well known types of filters which use the glass fibres or the polyolefin fibres in the Eurovent/Ashrae range of 6 and above. The first of these filters is a bag filter which employs a surface area commonly less than 10 $m^2$. These bag filters have traditionally used glass fibres as the filtration media but health concerns over recent years have led to a change to polyolefin fibres which are used in heavier weights than the glass fibres. The second type of filter is a pleated panel fitter which employs a surface area commonly between 8–20 $m^2$. These pleated panel filters continue to be generally manufactured from glass fibres because the higher efficiencies of glass fibres for a lower weight enable the filters to be pleated, thereby incorporating a larger surface area for a given panel size.

The polyolefin fibres are usually meltblown polyolefin fibres. Irrespective of the type of, filters employed, two factors are involved, namely filtration efficiency and pressure drop. The filtration efficiency may be regarded as the number of filtered particles arrested by the fibres, whilst the pressure drop may be regarded as the load required to suck air through the filter. The filtration efficiency and the pressure drop can be controlled by machine settings during the production of the meltblown polyolefin fibres.

The known meltblown polyolefin fibres are usually produced by melting polyolefin granules in an extruder or meltbox, and then forcing the melted granules through a die under pressure. High pressure hot air is introduced at the die and the hot air breaks up the extruded polymer into small non-continuous fibres. The fibres are blown on to a drum where they form a web. The drum rotates continuously so that as the web is formed, the web is separated from the drum. The separated web is taken through spreader rolls and is then wound onto a take-up roll. The size of the fibres and the density of the web can be controlled by the type of polyolefin used, the temperature to which polyolefin granules are melted in the extruder or meltbox, the temperature and pressure of the air at the die, the cool air quenching the fibres between the die and the drum, and the distance of the drum from the die. The filtration and the pressure drop can be controlled by machine settings during the production of the meltblown polyolefin fibres. Thus, for example, it is possible to compact the polyolefin fibres onto the drum and therefore produce polyolefin fibres which have a high efficiency and a high pressure drop when they are used for filtration purposes. It is also possible lightly to bond the meltblown polyolefin fibres as they hit the drum, in order to give a lower pressure drop and a lower efficiency filtration. The art of producing meltblown polyolefin fibres for use in filters is to achieve the best compromise from the available options, for any specific type of filter for which the meltblown polyolefin fibres are intended.

It is known to improve meltblown polyolefin fibres for filtration purposes by electrostatically charging the fibres. The electrostatically charging of the fibres makes it possible to have filters which have a low pressure drop and a high efficiency. However, electrostatically charged meltblown polyolefin fibres are affected by moisture. The electrostatic charge and therefore the performance of the filter become lost over a period of time in conditions above 70% humidity. Since filters are rarely re-tested once in use, any filter which falls below the minimum standard represents a hazard to the user.

It may generally be said that polyolefin fibres are safer to use from a health point of view than glass fibres, but the polyolefin fibres tend not to work as efficiently as the glass fibres. Fibres made from glass have a diameter of less than 5 microns in size, and they are thus fine enough to produce the required efficiency/pressure drop. Also, they are not affected by moisture. The polyolefin fibres do not lead to health problems as may the glass fibres, However known processes for producing polyolefin fibres are such that the polyolefin fibres are only able to be produced with diameters of not more than 5 microns in size because either the polyolefin becomes too brittle and breaks down, or else the fibres are so small that they do not have enough inertia to collect on the drum and form the web. If the fibres are so small, when they are blown towards the drum, they simply become airborne and do not collect on the drum. Thus difficulties have been encountered in producing polyolefin fibres of a diameter effectively less than an equivalent diameter to glass, that in less than 5 microns diameter. Therefore high performance mechanical filters using meltblown polyolefin fibres have generally not been available.

In an attempt to provide polyolefin fibres which do not suffer from the above problems, European Patent No. 0616831 discloses adding an electrostactically charged fluorochemical to a polyolefin fibre having a melt flow index of up to 400. The fluorocarbon additive remains within the fibres as they are produced by the meltblown process. For the fluorochemical to act to increase the filtration efficiency of the fibres, it is necessary for the fluorochemical to be on the surface of the fibres. In order to achieve this in the European patent, the fibres have to be provided with a second process step of annealing. More specifically, the formed web of meltblown polyolefin fibres is annealed for ten minutes at 140° C. in order to get the fluorochemical to migrate to the surface of the fibre, where it appears as a bloom on the surface of the fibres. The disadvantage of this separate annealing step is that it is cumbersome and it adds to the expense of the production of the meltblown polyolefin fibres.

SUMMARY OF THE INVENTION

It is an aim of the present invention to provide meltblown polyolefin fibres which are able to attain the required filtration properties of glass fibres but without the health hazard associated with glass fibres, and which at the same time do not require a separate annealing step.

Accordingly, in one non-limiting embodiment of the present invention there is provided a process for producing meltblown polyolefin fibres having an effective diameter of less than 5 microns, which process comprises providing a polyolefin having a melt flow index of at least 1000, mixing a fluorocarbon with the polyolefin in order to increase the melt flow index of the polyolefin to at least 2000, and meltblowing the polyolefin with the fluorocarbon in order to produce the meltblown polyolefin fibres, and the polyolefin being such that during the meltblowing the fluorocarbon is able to migrate to the surface of the formed polyolefin fibres without the need for a separate annealing step.

It is believed that the fluorochemical is able to migrate to the surface of the formed polyolefin fibres without the need for a separate annealing stop because the polyolefin has had its melt flow index increased from at least 1000 to at least 2000 by the addition of the fluorochemical. In other words, through the use of a polyolefin with a higher melt flow index than has hitherto been used, it is possible to bring the fluorochemical to the surface of the formed polyolefin fibres in a single meltblowing process, and without the need for a subsequent annealing step. This makes the process of the present invention cheaper than the process described in European Patent No. 0616831. Still further, the process of the present invention can be more flexible than the process described in the European Patent No. 0616831 because the process of the present invention makes it possible to produce both unbonded and bonded meltblown polyolefin fibres. The unbonded meltblown polyolefin fibres are preferably collected at a distance of 70 cm away from the die. The bonded polyolefin fibres are preferably collected at 18 cm away from the die.

The process of the present invention is able to produce meltblown polyolefin fibres having a surface coating of the fluorochemical and also the required effective diameter of less than 5 microns. The increasing of the melt flow index of the polyolefin from 1000 to at least 2000 by the addition of the fluorochemical surprisingly enabled the meltblown polyolefin fibres to be produced with an effective diameter of less than 5 microns and without breaking during the manufacturing process. The produced fibres are thus ideally suited for use in mechanical filters. For example, the produced fibres are ideally suited for use in pleated panel air filters, which require five square meters of the meltblown polyolefin fibres, instead of bag filters where meltblown polyolefin fibres is currently used which required ten square meters of the meltblown polyolefin fibre. In addition, the production of the meltblown polyolefin fibres in their fine form (i.e. with an effective diameter of less than 5 microns) means that the fibres do not have to be electrostatically charged to provide the required high levels of efficiency. Thus there is no subsequent reduction in performance over the life of the filter due to loss of the electrostatic charge. The polyolefin fibres are oilophillic. However, the surface treatment of fluorochemical makes the polyolefin fibres oilophobic. Filters made from such fibres are therefore suitable for applications such as hydraulic filters.

Preferably, the Polyolefin is Polypropylene. Other polyolefins may be employed if desired such for example as polyethylene, poly(1-butene) poly(1-pentene), Poly(3-methyl-1-butene), poly(1-hexene) poly(3-methyl-1-pentene), poly($^4$-methyl-1-pentene), Poly(1-heptene), poly (5-methyl -1-hexene), Poly (1-octene), poly(5-methyl-1-heptene), polyvinyl cyclohexane.

The fluorochemical will usually be a non-ionic fluorochemical.

The fluorochemical is preferably a fluoro-urethane. A presently preferred fluoro-urethane is Oxazolidinone. The oxazolidinone may be one having infrared traces. Fluorochemical sold under the commercial names of 3M's 1801 in Exxon 3485G or Himont's 8014R or 8015H made with Himont special granule Polypropylene, may be used.

The fluorochemical may have a melting point of at least 70° C. and a molecular weight of 500–2500. Preferably the fluorochemical has a melting point of at least 100° C. and molecular weight of 600–1200.

The polyolefin may be visbroken with a peroxide.

The meltblowing may comprise heating a mixture of the polyolefin and the fluorochemical, extruding the heated mixture through a die, and using high velocity hot air to break the extruded formed meltblowm polyolefin fibres into tiny filaments.

The present invention also provides meltblown polyolefin fibres when produced by the process of the invention. The present invention still further provides filters when provided with the meltblown polyolefin fibres of the invention.

An embodiment of the invention will now be described solely by way of example and reference to the accompanying drawing which shows a process for the production of meltblown polyolefin fibres.

BRIEF DESCRIPTION OF THE DRAWING

Referring to the drawing, there is shown apparatus 2 for producing meltblown polyolefin fibres 4. The apparatus 2 comprises a die 6 through which a molten mixture 8 of polyolefin in the form of polypropylene with a fluorochemical additive in the form of an oxazolidinone is extruded through an aperture 10 in the die 6. Hot air 12 is provided along hot air ducts 14 and the hot air 12 blows on to the molten mixture 8 as can be seen from the drawing.

DESCRIPTION OF THE PREFERRED EMBODIMENTS

As the molten mixture 8 leaves the aperture 10 it contacts cool air around the die 6 and this cool air quenches the extruded material and the fibres 4 are formed. The fibres 4 are in the form of non-continuous fibres which get blown towards a rotating drum 16. The fibres 4 collect on the drum 16 as a meltblown sheet 18. Due to the rotation of the drum 16, the sheet 18 passes off the drum 16 as shown.

The sheet 18 is formed of bonded non-continuous fibres 4. The sheet 18 may pass through a pair of rollers 20 where the sheet 18 may be given an optional electrostatic charge. The electrostatic charge may be given where it is intended to use the fibres 4 in filters which are not subjected to conditions of humidity above 70% or in other conditions likely to lead to loss of the electrostatic charge. The electrostatic charge may also be given where loss of the electrostatic charge does not matter. The sheet 18 then passes through a pair of spreading rollers 22, 24 which spread the sheet 18 and make it more uniform. The sheet is then leaves the spreading roller 24 and is wound up on a roller 26 as a roll 28 of the fibres 4 The roll 28 can then be stored, cut to size and used for filters as desired.

The produced polyolefin fibres 4 with the fluorochemical additive were tested by placing a mineral oil on the surface of the formed fibres 4 in the roll 28. The mineral oil remained as raised droplets on the surface of the fibres 4 in the roll 28 for several months. When polyolefin fibres produced without the additive or produced using a polymer with a melt flow index of less than 1000, were similarly provided with the mineral oil, then the mineral oil was readily absorbed into the fibres. Thus the mineral oil test indicates that the fibres 4 in the roll 28 having the fluorocarbon additive are such that the fluorochemical additive has migrated to the surface of the fibres. This in turn means that the fibres are as required for use in filters. More specifically, with the fluorochemical on the surf ace of the fibres, the flow properties of the fibres are improved, apparently by reducing the viscosity of the polyolefin, which in turn enables the production of the required fine fibres having an effective diameter of less than 5 microns.

Specific Examples for producing meltblown polyolefin fibres having a diameter of less than 5 microns will now be given.

EXAMPLE 1

Using a single screw extruder, there was prepared a peroxide polypropylene fibre-grade resin granule like 3495G from Exxon.

The die in the meltblowing machine was set at 500° F. (about 245°).

Using this process, the meltblown web overheated and was brittle. Collecting the fibres was difficult until the "web to die" distance was increased.

By measuring the produced meltblown polyolefin fibres with dioctyl phthalate smoke test (ASTMD 2986-91), it was determined that the produced meltblown polyolefin fibres gave a percent penetration of the smoke of close to 25. By experience it was known from this result that the fibre size was coarse with an effective diameter greater than 5 microns. Mineral oil droplets were applied to the surface of the produced meltblown polyolefin fibres and were readily absorbed into the fibres.

EXAMPLE 2

Using a single screw extruder, there was prepared a 13% add-on of oxazolidinone fluorochemical melt additive like 3M's 1801 into a peroxide polypropylene fibre-grade resin granule like 3495G from Exxon.

After drying blending in a Patterson-Kelly blender, the mix included 200 pounds of Exxon peroxide coated fibre-grade polypropylene resin such as 3545G with 35 pounds of additive like 3M's 1801 giving a concentration of approximately 1 of melt additive.

After running the meltblowing machine with 3545G (about 1200 MFR) alone with die temperatures at 500° F. (about 245° C.) it was found that the best quenching conditions set the air at about 525° F. (around 255° C.).

Collecting the web was difficult until the "web to die" distance was reduced,

By measuring the produced meltblown polyolefin fibres with dioctyl phthalate smoke test (ASTMD 2986-91), it was determined that the oxazolidinone fluorochemical melt additive gave a percent penetration of the smoke of less than 10. By experience it was known the fibre size was fine and had an effective diameter of less than 5 microns in size. Mineral oil was applied to the surf ace of the media where it remained as raised droplets for a period greater than 24 hours demonstrating that the fluorochemical melt additive had migrated to the surface of the fibre.

It is to be appreciated that the embodiment of the invention described above with reference to the accompanying drawing has been given by way of example only and that modifications may be effected. Thus, for example, the polyolefin fibres may be other than polypropylene fibres and they may be, for example, poly-4-pentene, 4-methylpentene-1-based polyolefin, and polystyrene.

What is claimed is:

1. A process for producing meltblown polyolefin fibers having an effective diameter of less than 5 microns, which process consisting essentially of providing a polyolefin having a melt flow index of at least 1000, mixing a fluorochemical with the polyolefin in order to increase the melt flow index of the polyolefin to at least 2000, and meltblowing the polyolefin with the fluorochemical in order to produce the meltblown polyolefin fibers, and the polyolefin being such that during the meltblowing the fluorochemical is able to migrate to the surface of the formed polyolefin fibers.

2. A process according to claim 1 in which the polyolefin is polypropylene.

3. A process according to claim 1 in which the fluorochemical is a non-ionic fluorochemical.

4. A process according to claim 1 in which the fluorochemical is a fluoro-urethane.

5. A process according to claim 4 in which the fluoro-urethane includes a fluorochemical oxazolidinone.

6. A process according to claim 5 in which the oxazolidinone has infrared traces.

7. A process according to claim 1 in which the fluorochemical has a melting point of at least 70° C. and a molecular weight of 500–2500.

8. A process according to claim 6 in which the fluorochemical has a melting point of at least 100° C. and a molecular weight of 600–1200.

9. A process according to claim 1 in which the polyolefin is visbroken with a peroxide.

10. A process according to claim 1 in which the meltblowing comprises heating a mixture of the polyolefin and the fluorochemical, extruding the heated mixture through a die, and using high velocity hot air to break the extruded formed meltblown polyolefin fibres into tiny filaments.

11. Meltblown polyolefin fibres when produced by a process as claimed in claim 1.

12. Filters when provided with meltblown polyolefin fibres as claimed in claim 11.

* * * * *

UNITED STATES PATENT AND TRADEMARK OFFICE
CERTIFICATE OF CORRECTION

PATENT NO. : 6,139,608
DATED : October 31, 2000
INVENTOR(S) : Timothy J. Woodbridge, Rowland A. Griffin It is certified that error appears in the above-identified patent and that said Letters Patent is hereby corrected as shown below:

Title Page, [86]
§ 371 Date:   "Nov. 6, 1999" should be --June 11, 1999--.
§ 102(e) Date:   "Nov. 6, 1999" should be --June 11, 1999--.

Signed and Sealed this

Third Day of July, 2001

*Attest:*

NICHOLAS P. GODICI
*Attesting Officer*   *Acting Director of the United States Patent and Trademark Office*